(12) United States Patent
Schmidt

(10) Patent No.: US 9,254,795 B2
(45) Date of Patent: Feb. 9, 2016

(54) WATER DRAIN PLUG

(71) Applicant: TRW Automotive Electronics & Components GmbH, Radolfzell (DE)

(72) Inventor: Martin Schmidt, Rockenhausen (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 4 days.

(21) Appl. No.: 13/961,010

(22) Filed: Aug. 7, 2013

(65) Prior Publication Data

US 2014/0048554 A1 Feb. 20, 2014

(30) Foreign Application Priority Data

Aug. 16, 2012 (DE) .......................... 10 2012 016 250

(51) Int. Cl.
*B65D 53/00* (2006.01)
*B60R 13/07* (2006.01)
*B62D 25/24* (2006.01)
*F16K 15/03* (2006.01)

(52) U.S. Cl.
CPC ................ *B60R 13/07* (2013.01); *B62D 25/24* (2013.01); *F16K 15/03* (2013.01)

(58) Field of Classification Search
CPC ........ B65D 55/12; B60R 13/07; B62D 25/24; F16K 15/03

USPC ................. 220/233, 234, 238, 849, 830, 827; 215/359, 361
See application file for complete search history.

(56) References Cited

U.S. PATENT DOCUMENTS 6,193,093 B1 * 2/2001 Brunner ........................ 220/234

FOREIGN PATENT DOCUMENTS

| DE | 297 11 482 | 10/1997 |
|----|------------|---------|
| DE | 696 02 994 | 1/2000 |
| DE | 100 12 754 | 9/2001 |
| DE | 10 2006 014 963 | 10/2007 |
| DE | 10 2007 026 543 | 12/2008 |
| DE | 10 2007 048 933 | 4/2009 |
| DE | 10 2010 055 637 | 6/2012 |
| DE | 102010055637 A1 * | 6/2012 |

* cited by examiner

*Primary Examiner* — J. Gregory Pickett
*Assistant Examiner* — Jennifer N Zettl
(74) *Attorney, Agent, or Firm* — Tarolli, Sundheim, Covell & Tummino LLP

(57) ABSTRACT

In a water drain plug (10) for a cavity (16) of a vehicle, in particular a side sill (14), comprising a base body (18) which can be fixed in an aperture (12) of the cavity (14) and has an opening (20) in which a sealing element (22) is arranged that is adapted to be moved between a closing position in which the opening (20) is tightly closed, and an opening position in which the opening (20) is open, the sealing element (22) is mounted in the base body (18) for pivoting movement about a retaining axis (36).

13 Claims, 5 Drawing Sheets

WATER DRAIN PLUG

RELATED APPLICATION

This application claims priority from German Patent Application No. 10 2012 016 250.2, filed Aug. 16, 2012, the subject matter of which is incorporated herein by reference in its entirety.

BACKGROUND OF THE INVENTION

The invention relates to a water drain plug for a cavity of a vehicle, in particular for a side sill, comprising a base body which can be fixed in an aperture of the side sill and has an opening in which a sealing element is arranged that is adapted to be moved between a closing position, in which the opening is tightly closed, and an opening position, in which the opening is open.

In the cavities of a vehicle, for example in the side sills, water drain openings are provided in order to drain water that can collect in the cavity. To prevent humidity or dirt from entering the cavity during travel, water drain plugs are provided which can close the water drain opening during travel and open the water drain opening at standstill to drain water collected in the cavity.

The water drain plug has a base body which can be inserted into the aperture of the cavity. A movable sealing element is arranged in this base body and can be moved between a closing position and an opening position. When the vehicle is at standstill, this sealing element is usually maintained in the open position by the force of gravity or a low spring preload, such that water can flow out of the cavity. During travel, the sealing element is moved into the closing position due to pressure differences on the outer side and the inner side of the cavity so that the aperture is tightly closed during the travel of the vehicle and a penetration of humidity or dirt is prevented.

Such a water drain plug is for example known from document DE 10 2007 026 543 A1. Here, the sealing element is mounted centrally on a vertical pin on the base body and is displaced vertically upwards into the closing position. To protect the sealing element, an additional covering element is provided which protects the sealing element against stone impacts, for example. However, the sealing element has a very large resting surface on the base body. This can lead to leaks in case stones or dirt get between the base body and the sealing element. In addition, the complete sealing element is displaced, wherein a clamping of the pin can occur under unfavorable conditions, so that the opening cannot be entirely sealed.

SUMMARY OF THE INVENTION

The object of the invention is to provide a water drain plug for a cavity of a vehicle, in particular for a side sill, which has a simpler structure and ensures a reliable sealing of the aperture.

To achieve the object, a water drain plug for a cavity of a vehicle, in particular for a side sill is provided, comprising a base body which can be fixed in an aperture of the side sill and has an opening in which a sealing element is arranged that is adapted to be moved between a closing position, in which the opening is tightly closed, and an opening position, in which the opening is open. According to the invention, the sealing element is mounted to the base body for pivoting movement about a retaining axis. In comparison with other solutions, for example the fitting of the sealing element to a pin or a different element displaceably mounted in the base body, the use of a retaining axis has, on the one hand, the advantage that the sealing element cannot get stuck on the base body. On the other hand, the sealing element is pivoted such that liquid can flow off via the sealing element tilted in the opening position, as a result of which dirt collected between the sealing element and the base body can be washed away along with the liquid. A reliable sealing of the opening in the base body is thus possible.

To pivotally mount the sealing element to the base body, the base body or the sealing element may be provided with a receiving means in which at least one retaining bolt provided on the sealing element or on the base body is pivotally mounted.

The receiving means may have a clipping or latching connection for the bolt, such that the latter can be mounted without additional tool. This also makes the replacement of the sealing element easier, for example in case of a damage of the sealing element.

A surrounding sealing rim is for example provided on the opening of the base body, on which the sealing element rests in a surrounding manner in the closing position.

The sealing rim is preferably arranged on an outer side of the base body, and the sealing element is pivoted away from the outer side into the opening position. To permit a complete discharge of the water out of the cavity, the water drain plug is arranged at the deepest place of the cavity, for example of a side sill. When the sealing element is pivoted away from the outer side, it is thus pivoted vertically downwards. The sealing element is therefore moved into the opening position by the force of gravity such that at standstill of the vehicle, an opening of the water drain plug and thus a discharge of the water can occur automatically. Furthermore, in this way, the sealing rim cannot form an upwardly directed groove in which water could collect.

A wind deflector, in particular a spoiler may be provided on the base body. By an appropriate shape of the spoiler or of the wind deflector on the outer side of the base body, water or dirt can be guided away from the water drain opening by the head wind, such that a penetration of dirt into the opening or a clogging of the water drain plug is prevented. Additionally, the spoiler can influence the pressure ratios on the water drain opening such that the closing of the water drain plug during travel is supported.

In order to cause a deflection of water or dirt that is as effective as possible, the wind deflector is preferably arranged in front of the opening in a direction of travel of the vehicle in the mounted state of the water drain plug. Dirt or humidity is therefore deflected before hitting the sealing element such that an ideal protection of the sealing element is possible.

The base body and/or the sealing element are for example made of plastic material, in particular of TPE.

BRIEF DESCRIPTION OF THE DRAWINGS

Further advantages and features will become apparent from the description below and from the accompanying figures which show.

DESCRIPTION OF EXEMPLARY EMBODIMENT

Figure 1:
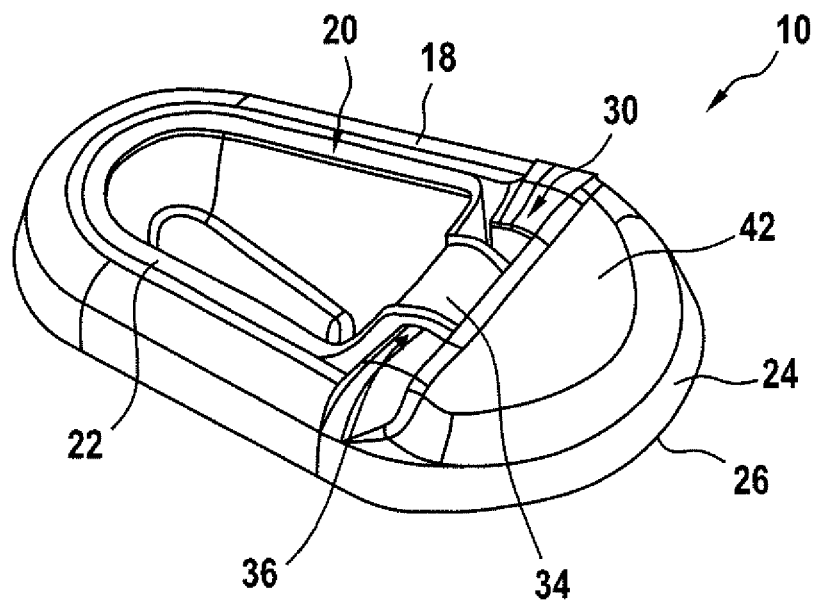
FIG. 1 a perspective view of a water drain plug according to the invention.
Figure 2:
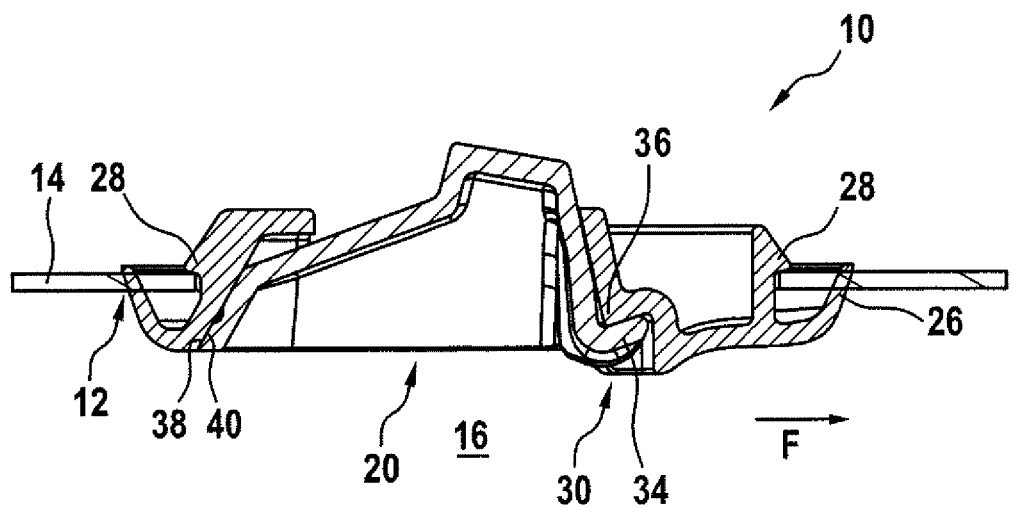
FIG. 2 a sectional view through the water drain plug of FIG. 1 in a closing position, FIG. 3 a sectional view through the water drain plug of FIG. 1 in an opening position, FIGS. 4a to 4c different views of the base body of the water drain plug of FIG. 1, and FIGS. 5a to 5d different views of the sealing element of the water drain plug of FIG. 1.
Figure 3:
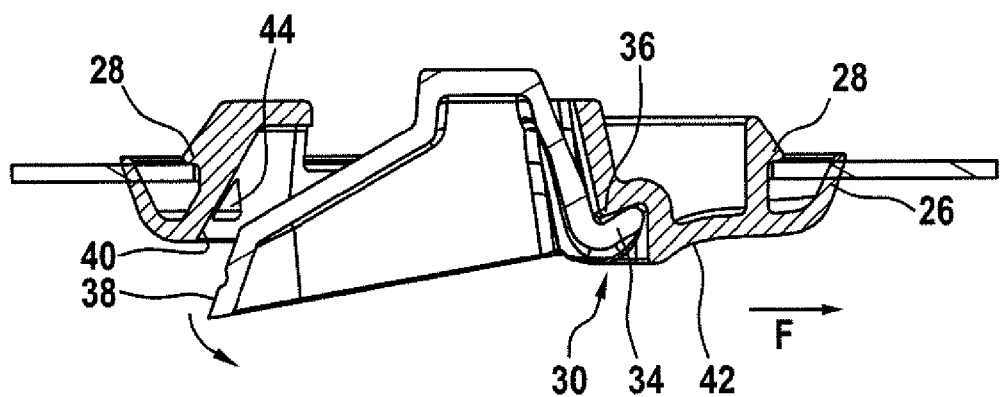

FIG. 1 shows a water drain plug 10 which can be inserted into an aperture 12 of a vehicle part, here a side sill 14 of a vehicle (see also FIGS. 2 and 3). During operation of the vehicle, water can collect in the cavity 16 of this side sill 14, which can flow out of the cavity 16 through the aperture 12.

During the travel operation of the vehicle, the water drain plug 10 closes the aperture 12 such that dirt or humidity can be prevented from entering the cavity 16 during travel. When the vehicle is at standstill, the water drain plug 10 opens such that liquid and dirt can flow out of the cavity 16.

The water drain plug 10 has a base body 18 which can be inserted into the aperture 12 and which has an opening 20. The water drain plug 10 further includes a sealing element 22 which, as shown below, is pivotally mounted to the base body 18 and can be moved between a closing position (FIG. 2), in which the opening 20 is sealed, and an opening position (FIG. 3), in which liquid can flow out of the opening 20.

Figure 4A:
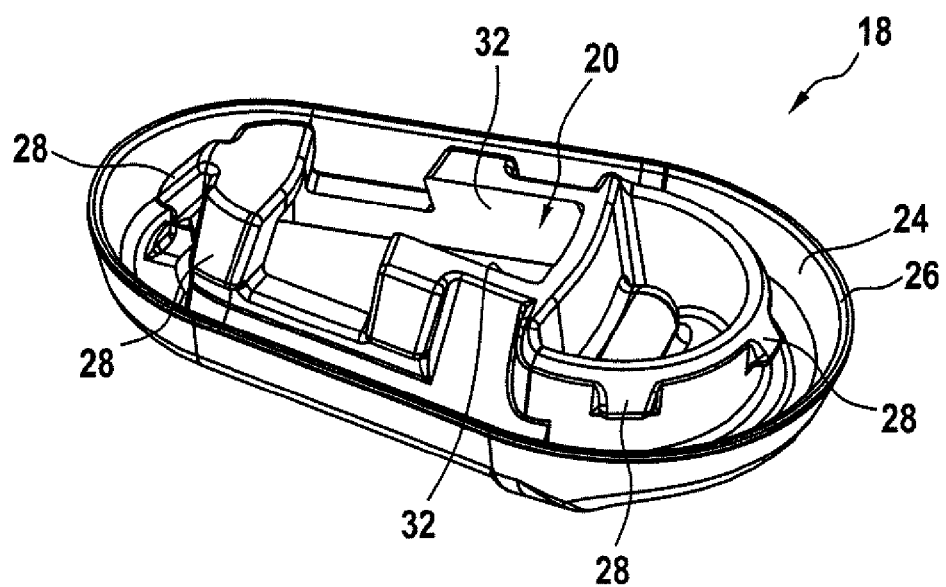
Figure 4B:
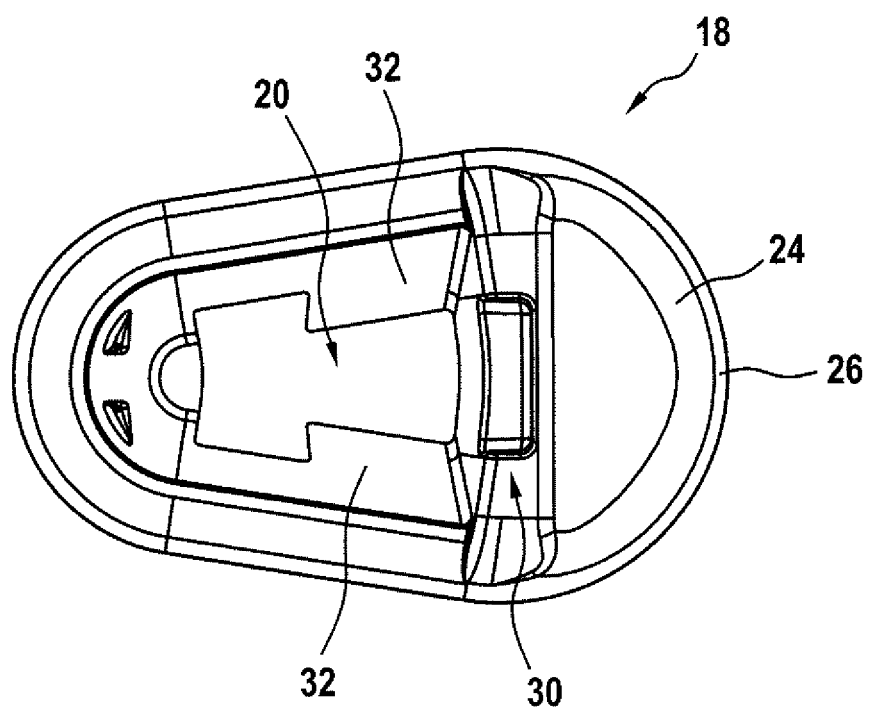
Figure 4C:
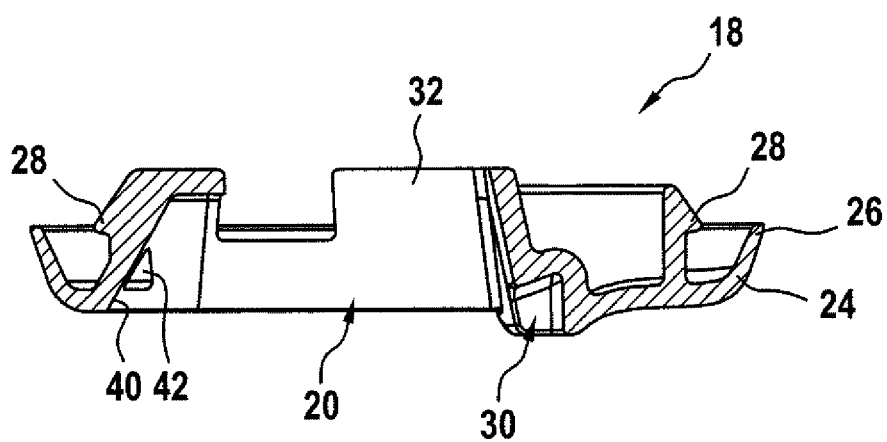
Figure 5A:
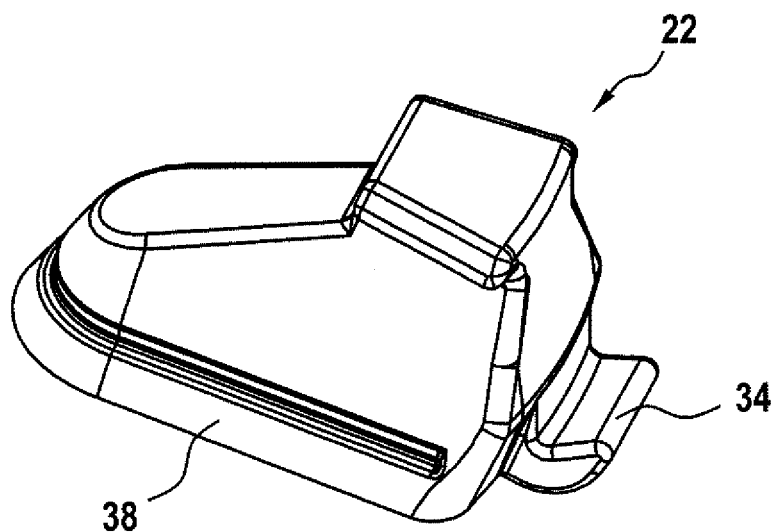
Figure 5B:
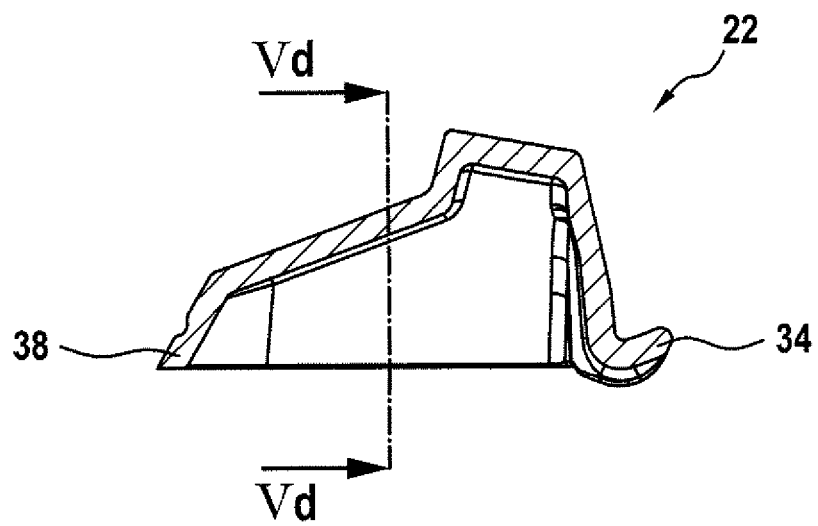
Figure 5C:
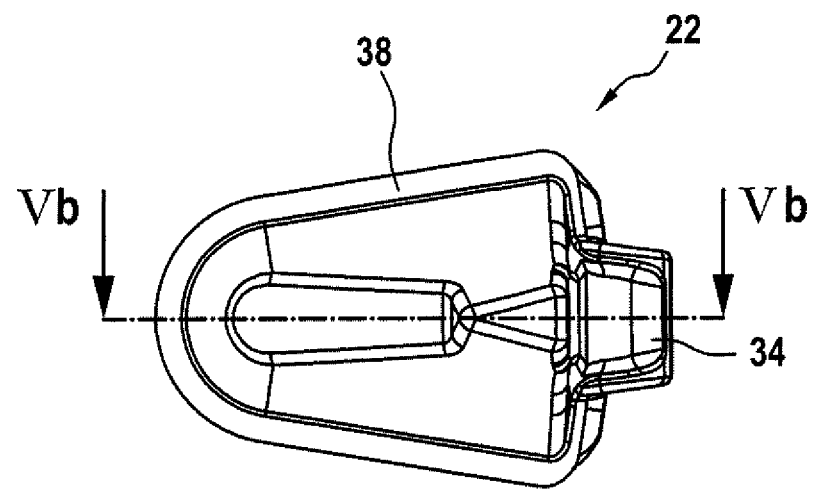
Figure 5D:
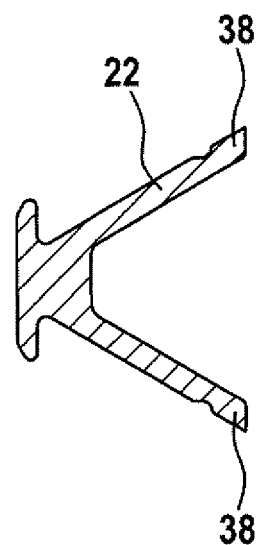

As can be seen in FIGS. 4a to 4c, the base body 18 has a frame 24 surrounding the opening 20 and provided with a sealing lip 26 which rests on the aperture 12 of the side sill 14 in a surrounding manner, and latching elements 28 by means of which the base body 18 can be latched on the rear side of the side sill 14.

The base body 18 further has a receiving means 30, which in the present case is formed as a latching connection and into which the sealing element 22 can be clipped. Furthermore, resting surfaces 32 are provided on the frame 24, which can guide the sealing element 22 upon movement into the closing position.

As can be seen in FIGS. 5a to 5d, the sealing element 22 includes a bolt or a projection 34 which is inserted into the receiving means 30 on the base body 18 and can be latched thereon. In the embodiment shown here, the sealing element 22 is realized in the shape of a tub such that it is curved in a concave manner to the inner side or to the cavity 16, as can be seen in FIGS. 2 and 3.

As can be seen in FIGS. 2 and 3, the sealing element 22 is mounted for pivoting movement about a retaining axis 36 formed here by the projection 34.

In case of a vehicle that is at standstill, the sealing element, with respect to FIG. 3, is moved down into the opening position due to the force of gravity, such that water can flow out of the cavity 16.

In the opening position, the sealing element 22, with respect to FIG. 3, is pivoted anticlockwise about the retaining axis 36, such that the opening 20 is open and water can flow out of the cavity 16. As can be seen in FIG. 3, the opening 20 of the base body 18 is provided with further recesses 44 which are sealed by the sealing element 22, which however permit in the opening position of the sealing element 22 the discharge of water out of the recesses of the base body 18, for example behind the sealing lip 26.

In the travel operation, the sealing element 22 is moved upwards or clockwise into the closing position, with respect to FIGS. 2 and 3, due to the pressure difference produced during travel between the cavity 16 and the outer side of the side sill 14, such that during travel of the vehicle, the cavity 16 is sealed and a penetration of dirt and water can be prevented.

In the closing position, the sealing element 22 rests via a rim 38 in a surrounding manner on a sealing rim 40 of the base body 18 and thus seals the opening 20 in the base body 18 in a fluid-tight manner, so that dirt or water is prevented from entering the cavity 16.

In the closing position, the sealing element 22 furthermore rests on the resting surfaces 32 of the base body 18. They stabilize the sealing element 22 so that no leaks due to a deformation of the sealing element 22 can occur. In addition, a centering of the sealing element 22 is automatically realized upon pivoting movement into the closing position.

A wind deflector 42 is furthermore provided on the base body 18, which is arranged in front of the opening 20 and thus in front of the sealing element 22 in a direction of travel F.

The wind deflector 42 furthermore diverts the airflow during travel such that the sealing element 22 is additionally pushed into the closing position and water or dirt is guided away from the opening 20 or from the sealing element 22, so that a clogging of the opening 20 or of the sealing element 22 which could lead to a reduced sealing is prevented.

In the embodiment shown here, the wind deflector 42 is arranged in front of the sealing element 22 in the direction of travel. The wind deflector 42 could however also be arranged at a different place of the base body 18. It is merely necessary to ensure that this dirt and water is guided away from the opening 20 or from the sealing element 22.

The invention claimed is:

1. A water drain plug (10) for a cavity (16) in a sill of a vehicle, comprising
    a base body (18) which can be inserted into an aperture (12) of the cavity (14) and has an opening (20) in which a sealing element (22) is arranged that is adapted to be moved between a closing position in which the opening (20) is tightly closed, and an openinq position in which the opening (20) is open,
    wherein the sealing element (22) is mounted in the base body (18) for pivoting movement about a retaining axis (36) that extends generally perpendicular to a direction of travel of the vehicle when the water drain plug is fixed in the aperture,
    the sealing element (22) in the closing position being located within the opening (20) in the base body (18) so as to rest against a sealing rim (40) and at least one centering surface (32)disposed within the base body (18) to seal the opening (20),
    the sealing element being arranged to move from the closing position to the opening position solely in response to gravity acting on the sealing element when the vehicle is at a standstill and to move from the opening position to the closing position in response to an air pressure difference between the cavity and an outer side of the sill,
    the sealing element being urged into the closing position by the air pressure difference produced between the cavity and the outer side of the sill during travel of the vehicle.

2. The water drain plug according to claim 1, wherein a receiving means (30) is provided on the base body (18) or on the sealing element (22), in which at least one projection provided on the sealing element (22) or on the base body (18) is mounted for pivoting movement.

3. The water drain plug according to claim 2, wherein the receiving means (30) has a clipping or latching connection for the projection.

4. The water drain plug according to claim 1, wherein the sealing rim (40) is arranged on an outer side of the base body (18) and the sealing element (22) is adapted to be pivoted away from the outer side into the opening position.

5. The water drain plug according to claim 1, wherein a wind deflector (42) comprising a spoiler is provided on the base body (18).

6. The water drain plug according to claim 5, wherein the wind deflector (42) is arranged in front of the opening (20) in the direction of trvel (F) of the vehicle when the base body (18) is mounted in the aperture (12).

7. The water drain plug according to claim 1, wherein in the base body (18) and/or the sealing element (22) is made of a thermoplastic elastomer.

8. A water drain plug for a cavity in a sill of a vehicle, the water drain plug comprising:
 a base body inserted into an aperture of the cavity; the base body including an opening; and
 a sealing element pivotally mounted to the base body for pivoting movement about a retaining axis that extends generally perpendicular to a direction of travel of the vehicle when the base body is fixed n the aperture, the sealing element being configured for movement between a closing position in which the sealing element seals the opening and an opening position in which the opening is open,
 the sealing element (22) in the closing position being located within the opening (20) in the base body (18) so as to rest against a sealing rim (40) and at least one centering surface (32) disposed within the base body (18) to seal the opening (20),
 the sealing element being arranged to move from the closing position to the opening position solely in response to gravity acting on the sealing element when the vehicle is at a standstill and to move from the opening position to the closing position in response to an air pressure difference between the cavity and an outer side of the sill,
 the sealing element being urged into the closing position by the air pressure difference produced between the cavity and the outer side of the sill during tral of the vehicle.

9. The water drain plug according to claim 8, wherein the sealing element is held in the closing position solely by the air pressure difference between the cavity and the outer side of the sill.

10. The water drain plug according to claim 8, wherein the sealing element is free from mechanical bias towards the opening position.

11. The water drain plug according to claim 1, wherein the sealing element is held in the closing position solely by the air pressure difference between the cavity and the outer side of the sill.

12. The water drain plug according to claim 1, wherein the sealing element is free from mechanical bias towards the opening position.

13. A water drain plug for a cavity in a sill of a vehicie, the water drain plug comprising:
 base body including an opening and being fixed in an aperture of the cavity; and
 a sealing element pivotally mounted to the base body for pivoting movement about a retaining axis that extends generally perpendicular to a direction of travel of the vehicle when the base body is fixed in the aperture, the sealing element being configured for movement between a closing position in which the sealing element seals the opening and an opening position in which the opening is open,
 the sealing element (22) in the closing position being located within the opening (20) in the base body (18) so as to rest against a sealing rim (40) and at least one centering surface (32) disposed within the base body (18) to seal the opening (20),
 the sealing element moving from the closing position to the opening position solely in response to the force of gravity acting on the sealing element and moving from the opening position to the closing position in response to a air pressure difference between the cavity and an outer side of the sill, the sealing element being held in the closing position solely by the air pressure difference between the cavity and an outer side of the sill.

* * * * *

UNITED STATES PATENT AND TRADEMARK OFFICE
CERTIFICATE OF CORRECTION

| | | |
|---|---|---|
| PATENT NO. | : 9,254,795 B2 | |
| APPLICATION NO. | : 13/961010 | |
| DATED | : February 9, 2016 | |
| INVENTOR(S) | : Martin Schmidt | |

It is certified that error appears in the above-identified patent and that said Letters Patent is hereby corrected as shown below:

In the Claims:

Column 5, claim 6, line 3 reads, "trvel" should read -- travel --

Column 5, claim 8, line 15 reads, "fixed n the aperture" should read -- fixed in the aperture --

Column 5, claim 8, line 33 reads, "tral" should read -- travel --

Column 6, claim 13, line 11 reads, "sill of a vehicie" should read -- sill of a vehicle --

Column 6, claim 13, line 13 reads, "base body including" should read -- a base body including --

Signed and Sealed this
Ninth Day of August, 2016

Michelle K. Lee
*Director of the United States Patent and Trademark Office*